United States Patent
Achenbach

(10) Patent No.: US 9,487,159 B2
(45) Date of Patent: Nov. 8, 2016

(54) VEHICLE VISION SYSTEM WITH CAMERA MODULE MOUNTING BRACKET

(71) Applicant: MAGNA ELECTRONICS INC., Auburn Hills, MI (US)

(72) Inventor: Garret Achenbach, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 296 days.

(21) Appl. No.: 14/242,038

(22) Filed: Apr. 1, 2014

(65) Prior Publication Data

US 2014/0226012 A1  Aug. 14, 2014

Related U.S. Application Data

(63) Continuation-in-part of application No. PCT/US2013/026101, filed on Feb. 14, 2013, and a continuation-in-part of application No. 14/233,507, filed as application No. PCT/US2012/048993 on Jul. 31, 2012.

(60) Provisional application No. 61/808,930, filed on Apr. 5, 2013, provisional application No. 61/600,205, filed on Feb. 17, 2012, provisional application No. 61/583,431, filed on Jan. 5, 2012, provisional application No. 61/514,191, filed on Aug. 2, 2011.

(51) Int. Cl.
*B60R 11/04* (2006.01)
*B60R 11/00* (2006.01)

(52) U.S. Cl.
CPC ........ *B60R 11/04* (2013.01); *B60R 2011/0026* (2013.01)

(58) Field of Classification Search
None
See application file for complete search history.

(56) References Cited

U.S. PATENT DOCUMENTS

| | | |
|---|---|---|
| 5,096,287 A | 3/1992 | Kakinami et al. |
| 5,550,677 A | 8/1996 | Schofield et al. |
| 5,670,935 A | 9/1997 | Schofield et al. |
| 5,796,094 A | 8/1998 | Schofield et al. |
| 5,877,897 A | 3/1999 | Schofield et al. |
| 5,920,061 A | 7/1999 | Feng |
| 5,949,331 A | 9/1999 | Schofield et al. |

(Continued)

FOREIGN PATENT DOCUMENTS

| | | |
|---|---|---|
| EP | 0889801 | 1/1999 |
| EP | 1025702 | 11/2006 |
| EP | 1504276 | 8/2012 |
| WO | WO2008024639 | 2/2008 |
| WO | WO2008127752 | 10/2008 |
| WO | WO2009046268 | 4/2009 |

(Continued)

*Primary Examiner* — Reza Aghevli
(74) *Attorney, Agent, or Firm* — Gardner, Linn, Burkhart & Flory, LLP

(57) ABSTRACT

A vehicle vision system includes a bracket having an attachment portion configured to attach at an in-cabin surface of a vehicle windshield. The bracket includes a camera module attachment portion and at least one of (i) a rain sensor attachment portion and (ii) an interior rearview mirror assembly attachment portion. With the bracket attached at the windshield, a camera module is mountable to the bracket. When the camera module is mounted at the bracket attached at the in-cabin surface of the windshield, a stray light shield shields the image sensor array of the camera module from light emanating from within the vehicle cabin. At least when the camera module is mounted at the bracket attached at the windshield, the stray light shield is disposed at the camera module and a lens of the camera module views via the pocket through the windshield of the vehicle.

20 Claims, 9 Drawing Sheets

(56) References Cited

U.S. PATENT DOCUMENTS

| | | | |
|---|---|---|---|
| 6,087,953 A | 7/2000 | DeLine et al. | |
| 6,097,023 A | 8/2000 | Schofield et al. | |
| 6,124,886 A * | 9/2000 | DeLine | B60Q 1/2665 |
| | | | 340/433 |
| 6,151,065 A | 11/2000 | Steed et al. | |
| 6,172,613 B1 | 1/2001 | DeLine et al. | |
| 6,243,003 B1 | 6/2001 | DeLine et al. | |
| 6,250,148 B1 | 6/2001 | Lynam | |
| 6,259,475 B1 | 7/2001 | Ramachandran et al. | |
| 6,278,377 B1 | 8/2001 | DeLine et al. | |
| 6,313,454 B1 | 11/2001 | Bos et al. | |
| 6,320,176 B1 | 11/2001 | Schofield et al. | |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,353,392 B1 | 3/2002 | Schofield et al. | |
| 6,396,397 B1 | 5/2002 | Bos et al. | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,466,136 B2 * | 10/2002 | DeLine | B60Q 3/023 |
| | | | 340/425.5 |
| 6,498,620 B2 | 12/2002 | Schofield et al. | |
| 6,501,387 B2 | 12/2002 | Skiver et al. | |
| 6,559,435 B2 | 5/2003 | Schofield et al. | |
| 6,593,565 B2 | 7/2003 | Heslin et al. | |
| 6,690,268 B2 | 2/2004 | Schofield et al. | |
| 6,768,422 B2 | 7/2004 | Schofield et al. | |
| 6,774,356 B2 | 8/2004 | Heslin | |
| 6,806,452 B2 | 10/2004 | Bos et al. | |
| 6,822,563 B2 | 11/2004 | Bos et al. | |
| 6,824,281 B2 | 11/2004 | Schofield et al. | |
| 6,831,261 B2 | 12/2004 | Schofield et al. | |
| 6,953,253 B2 | 10/2005 | Schofield et al. | |
| 6,968,736 B2 | 11/2005 | Lynam | |
| 7,004,593 B2 | 2/2006 | Weller et al. | |
| 7,095,572 B2 | 8/2006 | Lee et al. | |
| 7,205,904 B2 | 4/2007 | Schofield | |
| 7,215,479 B1 | 5/2007 | Bakin | |
| 7,262,406 B2 | 8/2007 | Heslin et al. | |
| 7,265,342 B2 | 9/2007 | Heslin et al. | |
| 7,289,037 B2 | 10/2007 | Uken et al. | |
| 7,311,406 B2 | 12/2007 | Schofield et al. | |
| 7,325,934 B2 | 2/2008 | Schofield et al. | |
| 7,339,149 B1 | 3/2008 | Schofield et al. | |
| 7,344,261 B2 | 3/2008 | Schofield et al. | |
| 7,355,524 B2 | 4/2008 | Schofield | |
| 7,388,182 B2 | 6/2008 | Schofield et al. | |
| 7,402,786 B2 | 7/2008 | Schofield et al. | |
| 7,420,159 B2 | 9/2008 | Heslin et al. | |
| 7,423,248 B2 | 9/2008 | Schofield et al. | |
| 7,425,076 B2 | 9/2008 | Schofield et al. | |
| 7,480,149 B2 | 1/2009 | DeWard et al. | |
| 7,526,103 B2 | 4/2009 | Schofield et al. | |
| 7,533,998 B2 | 5/2009 | Schofield et al. | |
| 7,536,316 B2 | 5/2009 | Ozer et al. | |
| 7,538,316 B2 | 5/2009 | Heslin et al. | |
| 7,551,103 B2 | 6/2009 | Schofield | |
| 7,579,939 B2 * | 8/2009 | Schofield | B60C 23/00 |
| | | | 340/425.5 |
| 7,616,781 B2 | 11/2009 | Schofield et al. | |
| 7,679,498 B2 | 3/2010 | Pawlicki et al. | |
| 7,728,721 B2 | 6/2010 | Schofield et al. | |
| 7,877,175 B2 | 1/2011 | Higgins-Luthman | |
| 7,888,629 B2 | 2/2011 | Heslin et al. | |
| 7,916,009 B2 | 3/2011 | Schofield et al. | |
| 7,918,570 B2 | 4/2011 | Weller et al. | |
| 7,946,505 B2 | 5/2011 | Lynam et al. | |
| 7,972,045 B2 | 7/2011 | Schofield | |
| 7,994,462 B2 | 8/2011 | Schofield et al. | |
| 8,063,759 B2 | 11/2011 | Bos et al. | |
| 8,070,332 B2 | 12/2011 | Higgins-Luthman et al. | |
| 8,090,153 B2 | 1/2012 | Schofield et al. | |
| 8,142,059 B2 | 3/2012 | Higgins-Luthman et al. | |
| 8,162,518 B2 | 4/2012 | Schofield | |
| 8,179,437 B2 | 5/2012 | Schofield et al. | |
| 8,194,133 B2 | 6/2012 | DeWind et al. | |
| 8,203,440 B2 | 6/2012 | Schofield et al. | |
| 8,222,588 B2 | 7/2012 | Schofield et al. | |
| 8,223,203 B2 | 7/2012 | Ohsumi et al. | |
| 8,239,086 B2 | 8/2012 | Higgins-Luthman | |
| 8,254,011 B2 | 8/2012 | Baur et al. | |
| 8,256,821 B2 | 9/2012 | Lawlor et al. | |
| 8,289,142 B2 | 10/2012 | Pawlicki et al. | |
| 8,294,608 B1 | 10/2012 | Lynam | |
| 8,314,689 B2 | 11/2012 | Schofield et al. | |
| 8,324,552 B2 | 12/2012 | Schofield et al. | |
| 8,325,986 B2 | 12/2012 | Schofield et al. | |
| 8,355,839 B2 | 1/2013 | Schofield et al. | |
| 8,376,595 B2 | 2/2013 | Higgins-Luthman | |
| 8,386,114 B2 | 2/2013 | Higgins-Luthman | |
| 8,405,725 B2 | 3/2013 | McMahon et al. | |
| 8,405,726 B2 | 3/2013 | Schofield et al. | |
| 8,451,332 B2 | 5/2013 | Rawlings | |
| 8,513,590 B2 | 8/2013 | Heslin et al. | |
| 8,531,278 B2 | 9/2013 | DeWard et al. | |
| 8,534,887 B2 | 9/2013 | DeLine | |
| 8,629,768 B2 | 1/2014 | Bos et al. | |
| 8,665,079 B2 | 3/2014 | Pawlicki et al. | |
| 8,743,203 B2 | 6/2014 | Karner | |
| 8,851,690 B2 | 10/2014 | Uken | |
| 8,944,655 B2 | 2/2015 | Verrat-Debailleul | |
| 9,150,165 B1 | 10/2015 | Fortin | |
| 9,156,403 B2 | 10/2015 | Rawlings | |
| 2002/0003571 A1 * | 1/2002 | Schofield | B60C 23/00 |
| | | | 348/148 |
| 2003/0169522 A1 | 9/2003 | Schofield et al. | |
| 2005/0141106 A1 | 6/2005 | Lee et al. | |
| 2006/0050018 A1 | 3/2006 | Hutzel et al. | |
| 2006/0061008 A1 * | 3/2006 | Karner | B29C 45/0017 |
| | | | 264/250 |
| 2006/0077575 A1 | 4/2006 | Nakai et al. | |
| 2006/0103727 A1 | 5/2006 | Tseng | |
| 2007/0109406 A1 | 5/2007 | Schofield et al. | |
| 2007/0120657 A1 | 5/2007 | Schofield et al. | |
| 2007/0221826 A1 | 9/2007 | Bechtel | |
| 2008/0252882 A1 | 10/2008 | Kesterson | |
| 2009/0208058 A1 * | 8/2009 | Schofield | G06K 9/00818 |
| | | | 382/103 |
| 2009/0295181 A1 * | 12/2009 | Lawlor | B60R 1/12 |
| | | | 296/1.11 |
| 2010/0110192 A1 | 5/2010 | Johnston et al. | |
| 2010/0118146 A1 | 5/2010 | Schofield et al. | |
| 2010/0134616 A1 | 6/2010 | Seger et al. | |
| 2010/0165468 A1 | 7/2010 | Yamada et al. | |
| 2010/0279439 A1 | 11/2010 | Shah et al. | |
| 2011/0025850 A1 * | 2/2011 | Maekawa | H05K 9/002 |
| | | | 348/148 |
| 2012/0008129 A1 | 1/2012 | Lu et al. | |
| 2012/0013741 A1 * | 1/2012 | Blake, III | B60R 11/00 |
| | | | 348/148 |
| 2012/0081550 A1 | 4/2012 | Sewell | |
| 2012/0182425 A1 | 7/2012 | Higgins-Luthman et al. | |
| 2012/0265416 A1 | 10/2012 | Lu et al. | |
| 2013/0002873 A1 | 1/2013 | Hess | |
| 2013/0044021 A1 | 2/2013 | Lynam | |
| 2014/0015977 A1 | 1/2014 | Taylor | |
| 2014/0043465 A1 | 2/2014 | Salomonsson | |
| 2014/0160284 A1 | 6/2014 | Achenbach et al. | |
| 2014/0226012 A1 | 8/2014 | Achenbach et al. | |
| 2015/0015713 A1 | 1/2015 | Wang | |
| 2015/0251605 A1 | 9/2015 | Uken et al. | |

FOREIGN PATENT DOCUMENTS

| | | |
|---|---|---|
| WO | WO2011/111465 | 9/2010 |
| WO | WO2013/019795 | 2/2013 |
| WO | WO2013/081984 | 6/2013 |
| WO | WO2013/081985 | 6/2013 |
| WO | WO2013/123161 | 8/2013 |

* cited by examiner

VEHICLE VISION SYSTEM WITH CAMERA MODULE MOUNTING BRACKET

CROSS REFERENCE TO RELATED APPLICATIONS

The present application claims the filing benefits of U.S. provisional application Ser. No. 61/808,930, filed Apr. 5, 2013, which is hereby incorporated herein by reference in its entirety, and the present application is a continuation-in-part of PCT Application No. PCT/US2013/026101, filed Feb. 14, 2013, which claims priority of U.S. provisional application Ser. No. 61/600,205, filed Feb. 17, 2012, which are hereby incorporated herein by reference in their entireties, and the present application is a continuation-in-part of U.S. patent application Ser. No. 14/233,507, filed Jan. 17, 2014, which is a 371 filing of PCT Application No. PCT/US2012/048993, filed Jul. 31, 2012, which claims priority of U.S. provisional applications, Ser. No. 61/583,431, filed Jan. 5, 2012, and Ser. No. 61/514,191, filed Aug. 2, 2011, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems, such as for machine vision applications in vehicles, is common and known. Packaging of forward facing imagers is also known, such as described in U.S. Pat. Nos. 7,262,406; 7,265,342; 7,420,159; 7,480,149; 7,533,998; 7,538,316; 7,916,009; 8,179,437; and/or 8,405,726, which are hereby incorporated herein by reference in their entireties. Examples of known vision systems are described in U.S. Pat. Nos. 8,324,552; 8,314,689; 8,289,142; 8,222,588; 8,239,086; 8,203,440; 7,994,462; 7,655,894; 7,339,149; 7,344,261; 7,459,664; 7,423,248; 6,097,023; 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, which may be displayed or processed to provide the desired display images and/or processing and control, depending on the particular application of the camera and vision or imaging system. The present invention provides a stray light shield for a forward facing imaging (FFI) machine vision camera module. The camera module is configured to attach at the vehicle windshield and an interior rearview mirror assembly may attach at the module or at a bracket of the module. A rain sensor may also attach at the bracket, such as when the bracket is attached at the vehicle windshield.

These and other objects, advantages, purposes and features of the present invention will become apparent upon review of the following specification in conjunction with the drawings.

DESCRIPTION OF THE PREFERRED EMBODIMENTS

Figure 1:
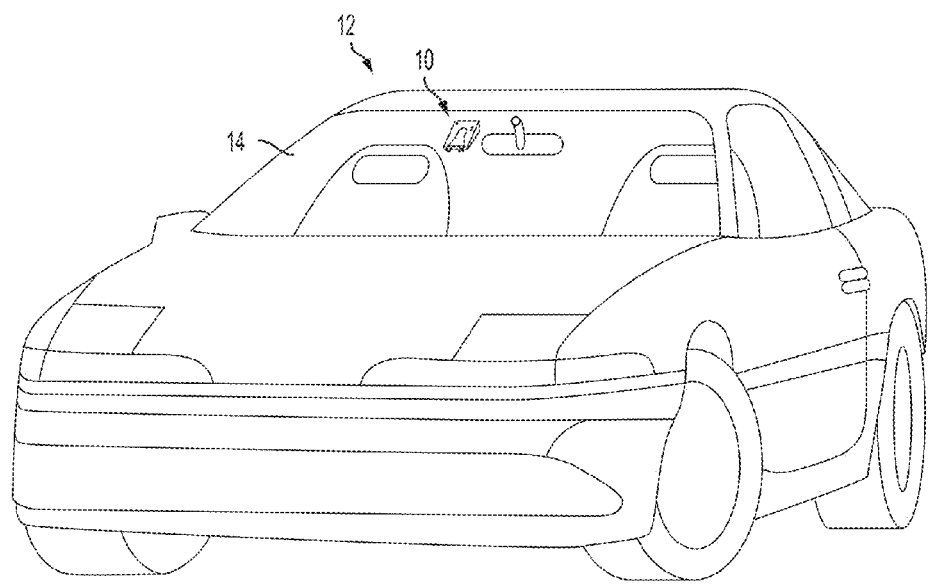
FIG. 1 is a perspective view of a vehicle having the vehicular camera system.

A vehicular camera system can be installed on the inside of the front windshield of a vehicle, such as a car, truck, bus, or van. Such a camera system may be used for a variety of functions such as object detection, lane keeping, and high beam control. FIG. 1 shows an example of a vehicular camera system or module 10 configured to be attached in a front-facing manner to a vehicle 12, such as at a windshield 14 of a vehicle 12. The camera system 10 includes a housing and a lens barrel projecting therefrom.

The camera system or camera module of the present invention may utilize aspects of the systems and/or modules described in PCT Application No. PCT/US2013/026101, filed Feb. 14, 2013 and published Aug. 22, 2013 as International Publication No. WO 2013/123161, and/or PCT Application No. PCT/US2012/048993, filed Jul. 31, 2012 and published Feb. 7, 2013 as International Publication No. WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613; and/or 6,087,953, and/or U.S. patent application Ser. No. 11/721,406, filed Jun. 11, 2007 and published Dec. 3, 2009 as U.S. Publication No. US-2009-0295181, which are all hereby incorporated herein by reference in their entireties.

In the illustrated embodiment, a mounting bracket 20 is configured to attach at the vehicle windshield, such as via direct adhesive attachment of the bracket to the windshield or via attachment of the bracket to one or more attaching elements that are adhesively attached at the windshield. For example, narrowing slots or the like may be provided in the frame or bracket 20 to removably mate with knobs or structure on the backs of the attaching elements or fixing elements, while pads of the attaching or fixing elements may be attached to the vehicle windshield by way of an adhesive (and such as by utilizing aspects of the modules described in U.S. patent application Ser. No. 11/721,406, filed Jun. 11, 2007 and published Dec. 3, 2009 as U.S. Publication No. US-2009-0295181, which is hereby incorporated herein by reference in its entirety). Alternatively, the pads can be suction pads. Direct attachment of the bracket may be preferred over attachment via posts, because of the increased or enhanced surface area at which the bracket interfaces with and attaches at the windshield surface. Although not shown, the mirror mounting portion may be made larger to enhance attachment of the bracket at the windshield surface. A suitable adhesive joint to directly attach the bracket to the windshield (or to attach the likes of three or four attachment posts/pins/elements to hold the bracket at the windshield) is formed by curing 3M structural bonding tapes (such as 9214, or 9270 or 9263) in an autoclave process during fabrication of a laminated windshield such as disclosed in U.S. Pat. No. 5,587,236, which is hereby incorporated herein by reference in its entirety. Such 3M structural bonding tapes are available from 3M Company of St. Paul, Minn. and are modified epoxy adhesive tapes. Alternately, a urethane or a silicone adhesive can be used.

The bracket may be formed via any suitable forming means. For example, the bracket may comprise a metal bracket and may be formed by a metal forming process, such as, for example, die casting, sintering or the like. The bracket may comprise any suitable metal, such as, for example, aluminum or zinc or magnesium (preferred when light weight construction is desired) or the like. Alternately, the bracket may be formed of a polymeric material, such as an engineering plastic or the like, and may be formed by injection molding. Examples of suitable engineering plastics include Ultra-high-molecular-weight polyethylene (UHM-WPE), Nylon 6, Nylon 6-6, Acrylonitrile butadiene styrene (ABS), Polycarbonates (PC), Polyamides (PA), Polybutylene terephthalate (PBT), Polyethylene terephthalate (PET), Polyphenylene oxide (PPO), Polysulphone (PSU), Polyetherketone (PEK), Polyetheretherketone (PEEK), Polyimides, Polyphenylene sulfide (PPS), Polyoxymethylene plastic (POM/Acetal), and/or blends/combinations thereof. Engineering plastics typically have high strength and have mechanical properties akin to those of metal. The bracket can be formed by injection molding of an engineering plastic. Other polymeric materials can be optionally used, such as dense polyolefins (such as polypropylene or polyethylene) or urethane or epoxy. Alternately, the bracket may be partially constructed of a plastic or polymeric material and a metal material formed together. For example, a mirror mounting portion of the bracket may be formed of a metallic material and the rest of the bracket (including the camera module mounting portion) may comprise a polymeric material that is preferably integrally molded or formed at or around or partially around the metallic mirror mounting portion.

The mounting bracket 20 is configured to provide a mounting location or attachment location for a rain sensor device 22 and/or the forward facing camera module 10 and/or an interior rearview mirror assembly 24.

Figure 2:
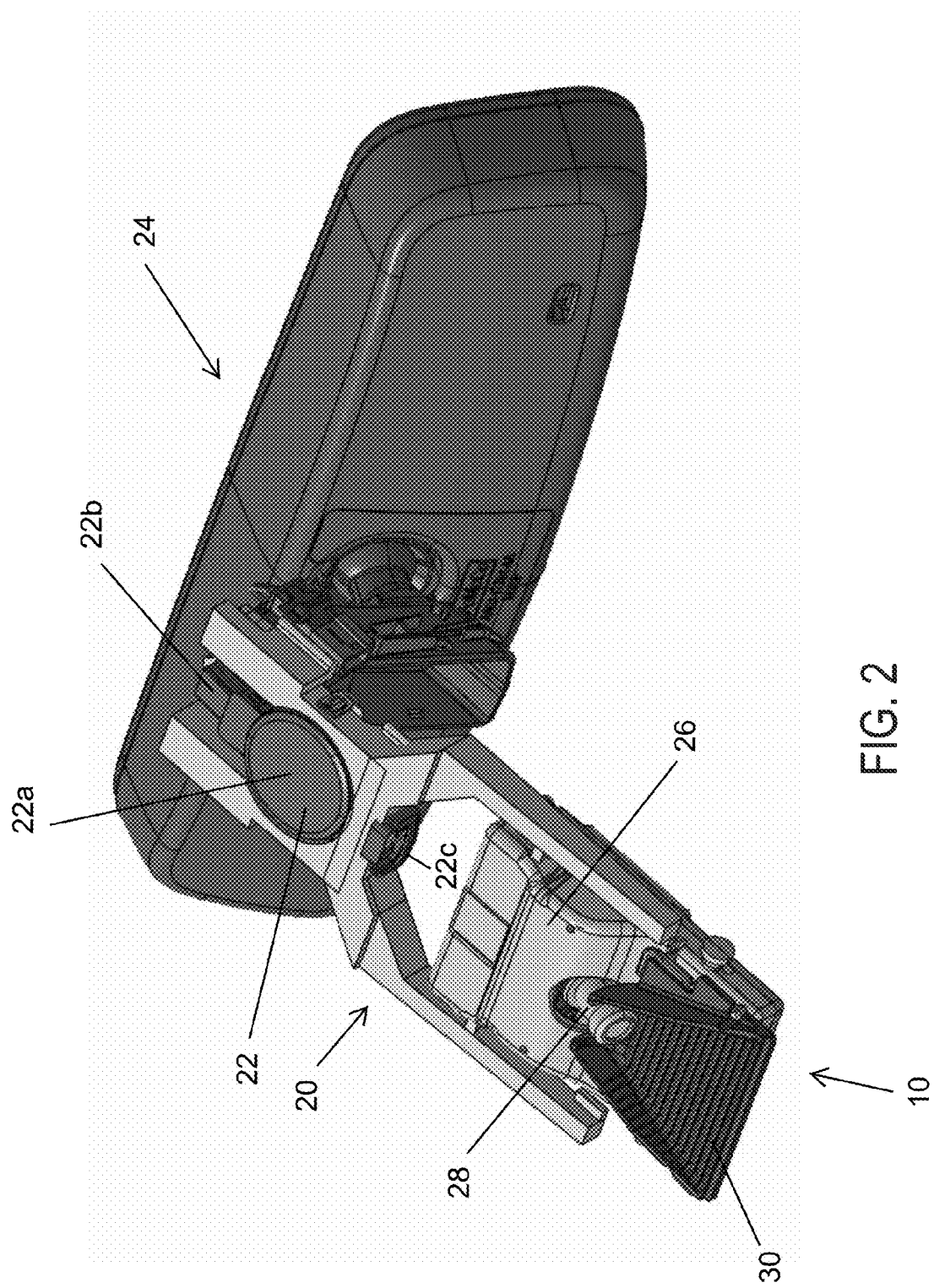
FIG. 2 is a perspective view of a mounting bracket for mounting a camera module and an interior rearview mirror assembly at a windshield of a vehicle.
Figure 3:
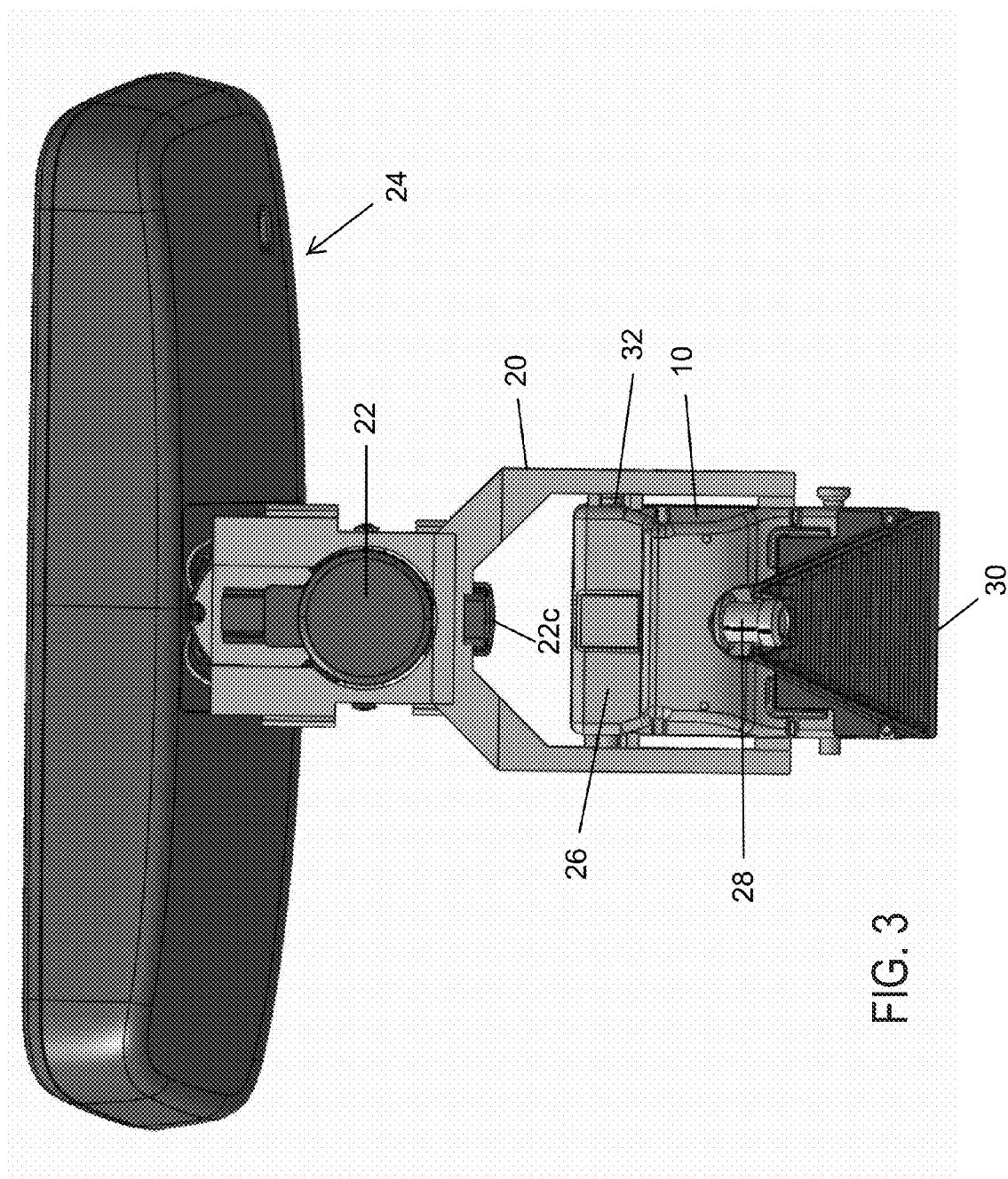
FIGS. 3-5 are views of the mounting bracket and camera module and interior rearview mirror assembly of FIG. 2.
Figure 4:
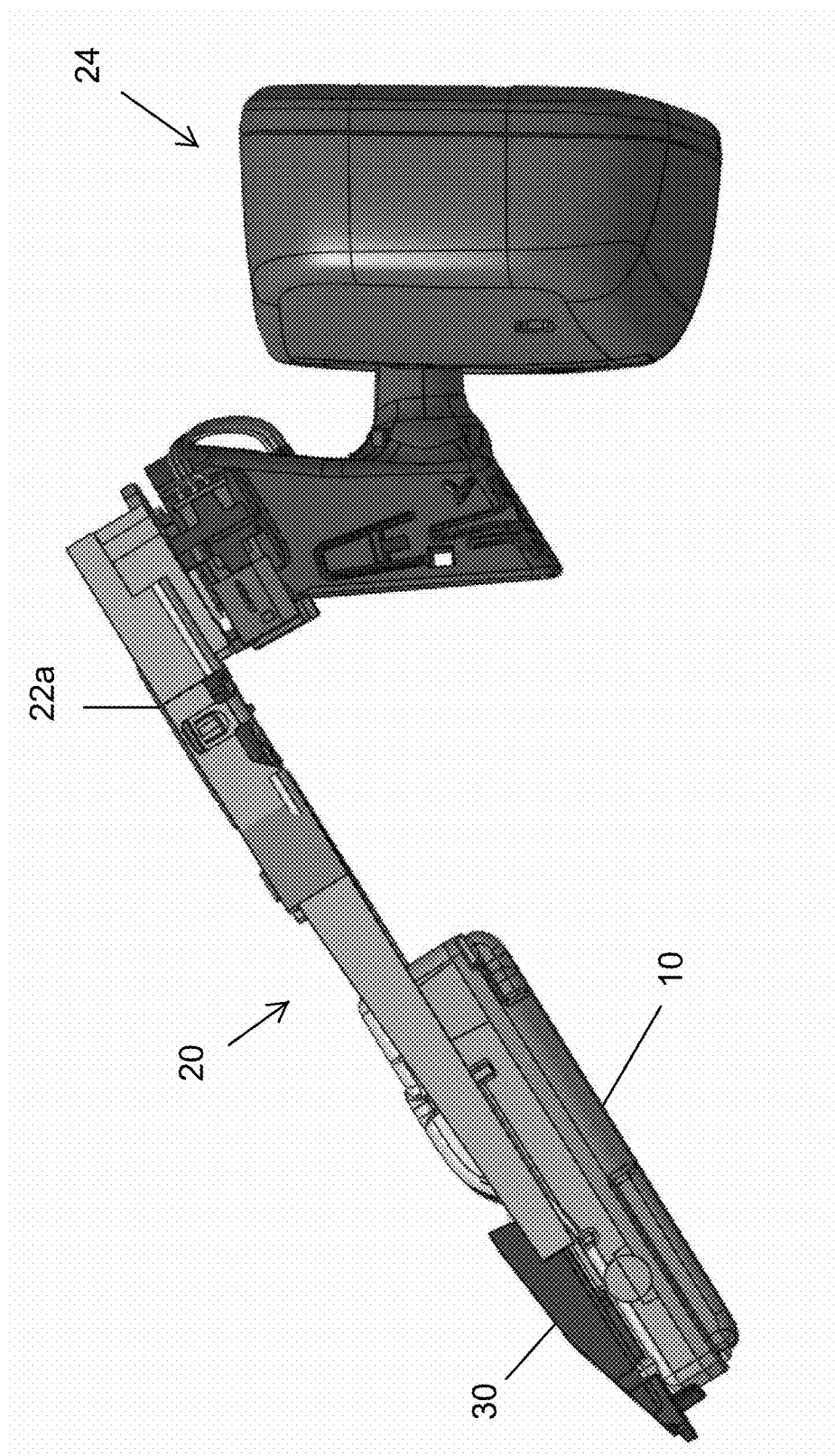
Figure 5:
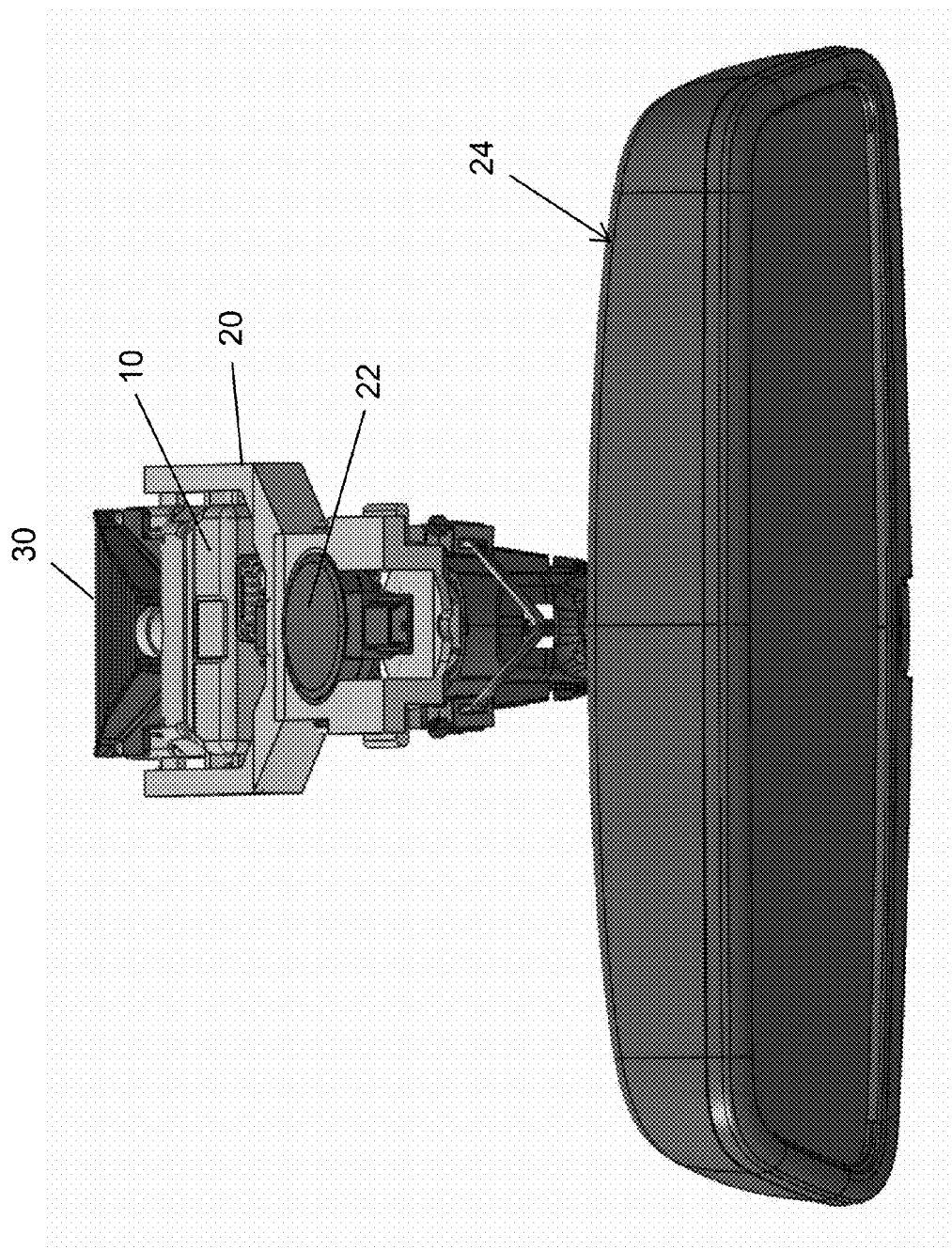
Figure 7:
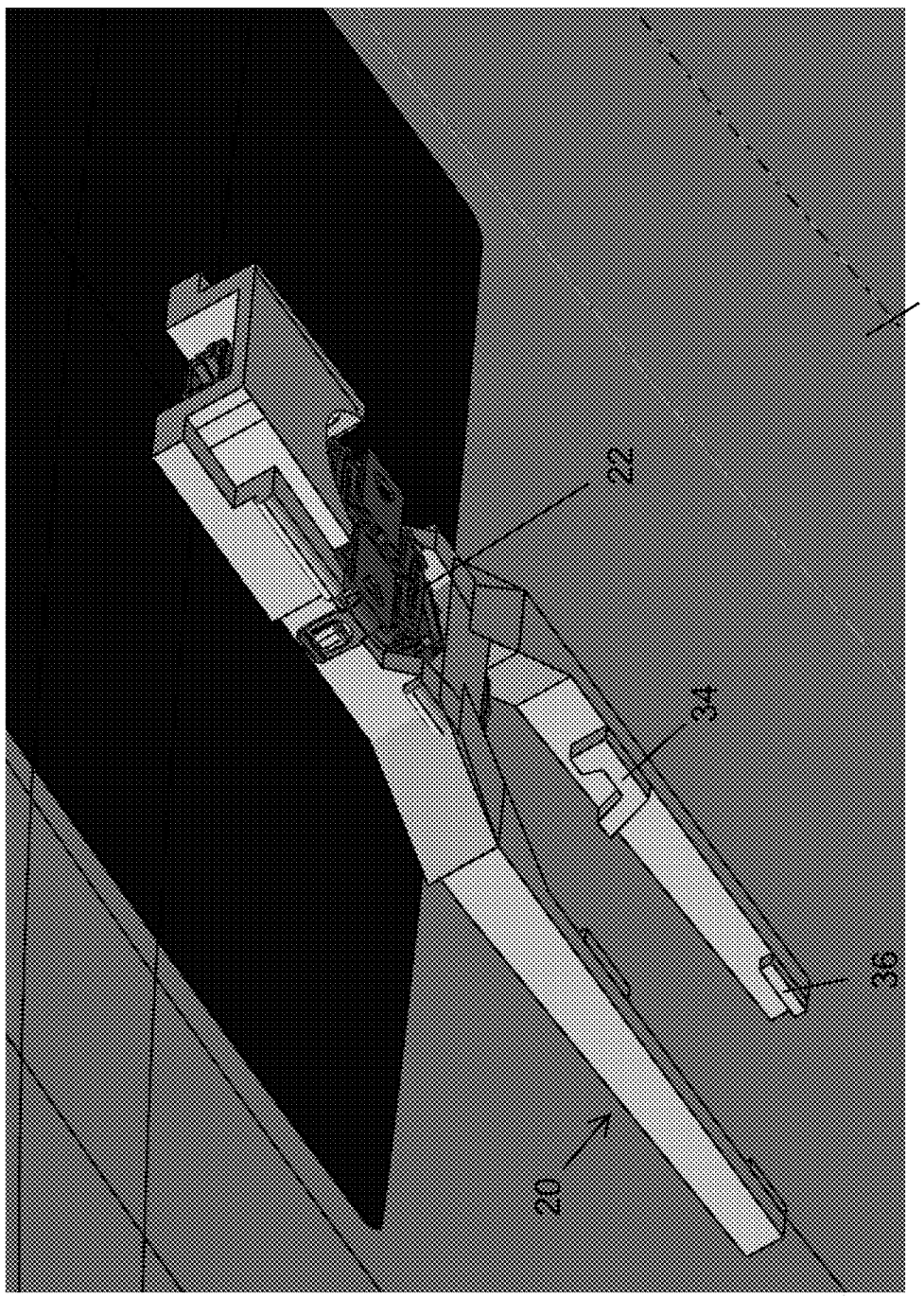
FIG. 7 is another perspective view of the mounting bracket of FIG. 6, shown with a rain sensor device mounted thereat.
Figure 8:
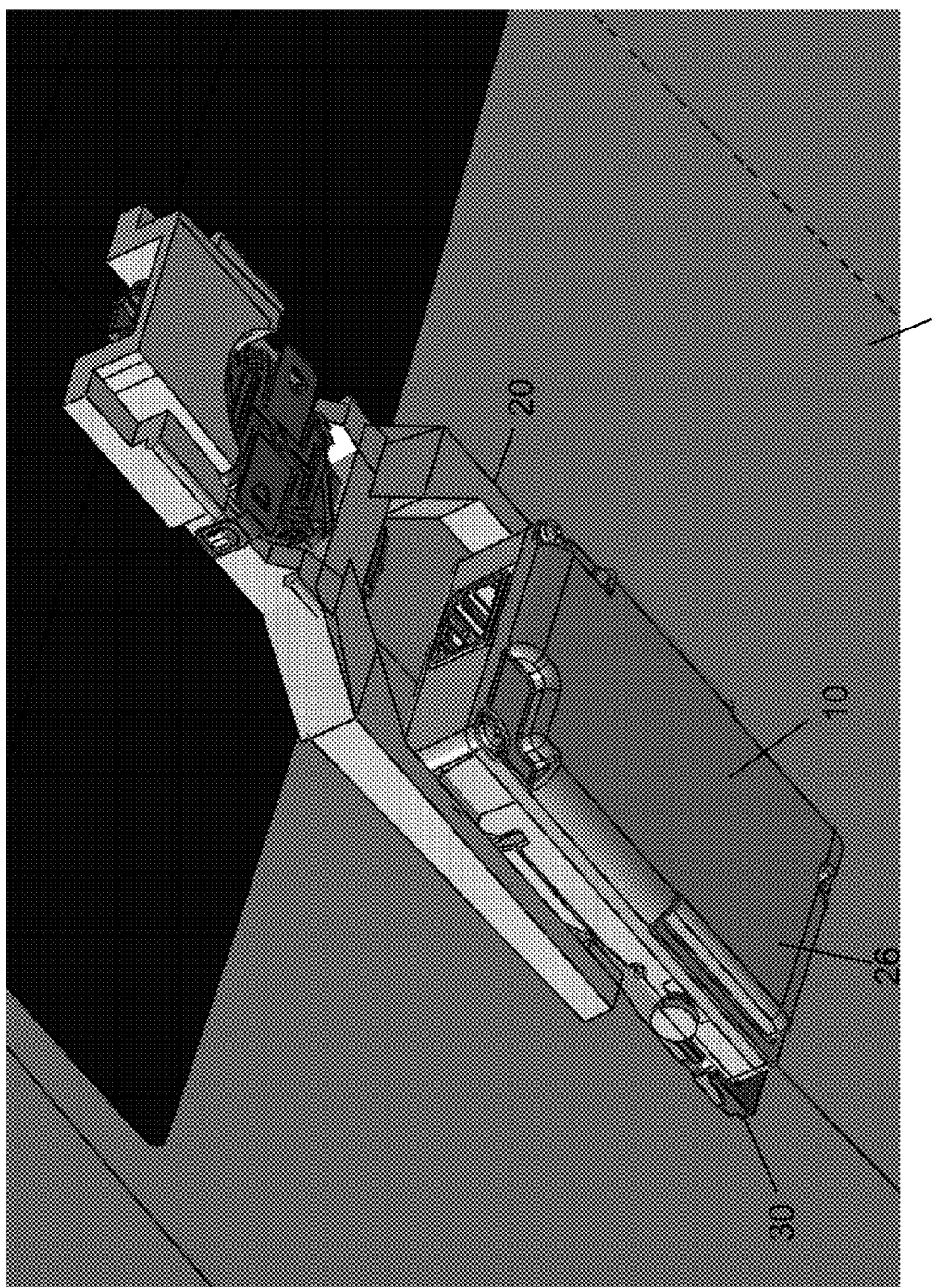
FIG. 8 is another perspective view of the mounting bracket of FIG. 7, shown with a camera module mounted thereat.
Figure 9:
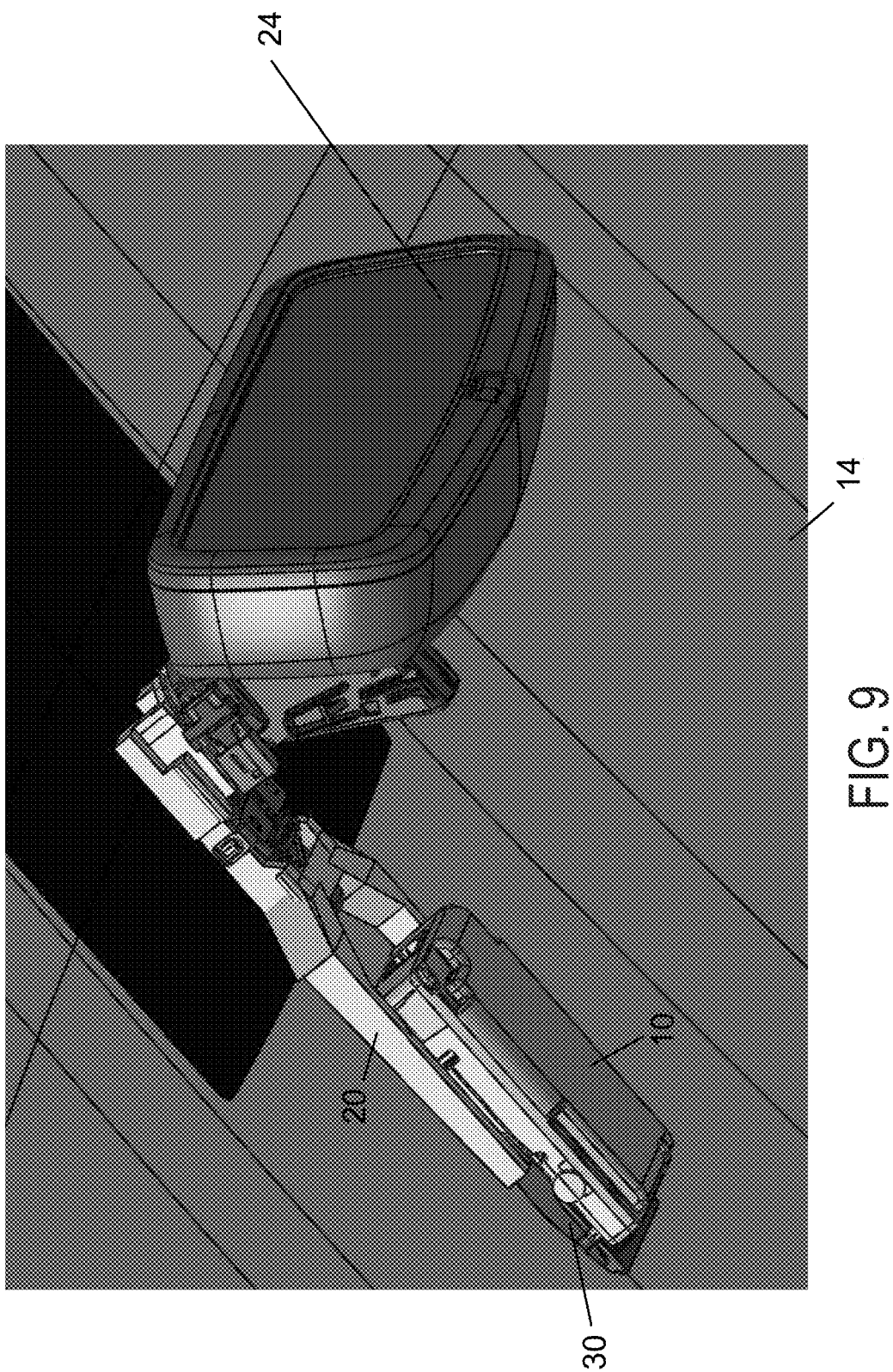
FIG. 9 is another perspective view of the mounting bracket of FIG. 8, shown with an interior rearview mirror assembly mounted thereat.

As can be seen with reference to FIGS. 2-5 and 7, the rain sensor device 22 may be received at an aperture or slot of the bracket 20, such that a sensing surface 22a of the rain sensor device may be at or optically coupled to the in-cabin surface of the windshield (when the rain sensor is mounted at the bracket and the bracket is attached at the windshield), such as via spring-loading using a resilient element to urge the rain sensor sensing surface towards the windshield and/or such as when an interior rearview mirror is secured at the bracket as described below. As best shown in FIG. 7, the rain sensor device 22 may insert and/or secure at the bracket, and preferably attaches via snap attachment at one or more tabs of the bracket, when the rain sensor is disposed at the bracket, with an electrical connector 22b (such as a multi-pin plug or socket) disposed at an upper end or region of the bracket for electrical connection to an electrical connector of a vehicle wiring harness. As shown in FIGS. 2 and 3, a second electrical connector 22c may be provided for electrical connection to an electrical connector of the camera module 10 when the camera module 10 is attached or mounted at the bracket 20. This aspect of the present invention can benefit from and utilize the disclosures of U.S. Pat. Nos. 6,326,613 and/or 6,250,148, which are hereby incorporated herein by reference in their entireties.

The camera module 10 comprises a housing 26 that houses a camera 28, and includes a stray light baffle or shield 30 attached at the housing. The camera module, and its housing and camera and shield, may be similar to the camera module components described in PCT Application No. PCT/US2013/026101, filed Feb. 14, 2013 and published Aug. 22, 2013 as International Publication No. WO 2013/123161, and/or PCT Application No. PCT/US2012/048993, filed Jul. 31, 2012 and published Feb. 7, 2013 as International Publication No. WO 2013/019795, which are hereby incorporated herein by reference in their entireties.

The camera module may attach at the bracket 20 via any suitable means, and may detachably attach so that the camera module may be detached for service or replacement while the bracket remains attached at the windshield surface. In the illustrated embodiment, the camera module 10 includes structure, such as, for example, protrusions 32 or the like, at its sides (and near the rear of the module) that are received in receptacles or receiving portions 34 of the bracket 20 when the camera module is mounted at the bracket. A pair of supports or structure 36 are provided at the bracket 20 to support a forward portion of the camera module when the camera module is mounted at the bracket. When so mounted at the bracket that is attached at the windshield of the vehicle, the stray light shield 30 is disposed generally at the in-cabin surface of the windshield so that the camera views through or across the recess established by the light shield and through the windshield, such as through an aperture or region of the windshield that is devoid of an opaque hiding layer or frit layer or the like.

The stray light shield may comprise ridges positioned (such as below and in front of the lens) to reduce the amount of light reflected into the lens (such as by utilizing aspects of the vision systems described in PCT Application No. PCT/US2013/026101, filed Feb. 14, 2013 and published Aug. 22, 2013 as International Publication No. WO 2013/123161, and/or PCT Application No. PCT/US2012/048993, filed Jul. 31, 2012 and published Feb. 7, 2013 as International Publication No. WO 2013/019795, which are hereby incorporated herein by reference in their entireties). Further, a shield gasket can be positioned on the frame or bracket 60 around the lens to reduce incursion of dust, particulate, or moisture into the vicinity of the lens. The gasket may utilize aspects of the gaskets described in U.S. patent application Ser. No. 12/393,223, filed Feb. 26, 2009, which is hereby incorporated herein by reference in its entirety. Thus, the frame or bracket may be attached at fixing elements (which may be adhered at the in-cabin surface of the vehicle windshield), whereby a tapered or wedge-shaped recess or pocket (having the stray light shield portion and tapered sidewalls) is disposed in front of the camera and lens with the camera and lens viewing through the pocket and through the vehicle windshield. Optionally, the system may have a separate light shield or the light shield may be part of the bracket itself, such as by utilizing aspects of the systems described in U.S. Pat. No. 6,824,281, which is hereby incorporated herein by reference in its entirety.

The light shield element may be configured to be partially received at a generally planar light shield attaching portion of the camera module, such as in a similar manner as described in PCT Application No. PCT/US2013/026101, filed Feb. 14, 2013 and published Aug. 22, 2013 as International Publication No. WO 2013/123161, and/or PCT Application No. PCT/US2012/048993, filed Jul. 31, 2012 and published Feb. 7, 2013 as International Publication No.

WO 2013/019795, which are all hereby incorporated herein by reference in their entireties. The light shield may include an adhesive layer or pad (such as a pressure sensitive adhesive layer, such as a VHB adhesive or the like, such as, for example, an Acrylic Plus Tape Series EX4000 adhesive commercially available from 3M of St. Paul, Minn.) that adheres the base of the light shield at the attaching portion of the camera module.

After the light shield is attached or adhered at the camera module, the camera module and light shield construction or assembly may be attached at the bracket (such as a bracket already attached at a windshield of a vehicle or at a bracket that is configured for attachment at a windshield of a vehicle). The bracket and light shield may be selected for a particular vehicle windshield application to adapt or configure the camera module for that particular vehicle windshield application. The bracket may be configured to attach at a vehicle windshield via any suitable manner, such as via a plurality of fixing elements or buttons that are adhered at the vehicle windshield and that are received through respective slots or apertures of the bracket, such as in a similar manner as described above, or the bracket may be adhered directly at the vehicle windshield or may otherwise attach to one or more fixing elements or buttons adhered at the vehicle windshield.

The bracket is formed such that it at least partially circumscribes the light shield, with the roof or upper boundary of the light shield (when disposed at the windshield-attached bracket) comprising the windshield. Optionally, a sealing element may be disposed at and along the upper edge region of the light shield for sealing against the in-cabin surface of the windshield or against a portion of the bracket (where the bracket may overlap the side walls of the light shield, and where the bracket may include a sealing element to seal against the in-cabin surface of the windshield). Thus, when the light shield and camera module are disposed at the windshield-attached bracket, the roof of the pocket (the upper boundary of the pocket of the stray light shield) is formed by the windshield and optionally a portion of the bracket and windshield. For example, the stray light shield, when disposed at the windshield-attached bracket, is aligned with an aperture or opening of the bracket, and a perimeter portion of the bracket that circumscribes or partially circumscribes the bracket aperture or opening may overlap the side walls and may extend over the stray light shield such that a small portion of the "roof" of the stray light shield comprises the circumscribing portion of the bracket (and optionally the circumscribing portion of the bracket may have light traps or ribs or columns thereat). The field of view of the camera, when the camera module and stray light shield are disposed at the windshield-attached bracket, preferably views through the aperture of the bracket (and may also view through an aperture of an opaque layer or frit layer at the windshield) and preferably does not encompass the circumscribing portion of the bracket (or any portion of the opaque layer at the windshield that circumscribes the aperture at the opaque layer).

As shown in FIGS. 2-5 and 9, the interior rearview mirror assembly 24 may be snap attached or otherwise attached at the bracket 20. In the illustrated embodiment, the mirror assembly 24 is attached at an upper portion of the bracket at a mounting structure that may provide a similar construction as that of a mirror mounting button. The mirror assembly is thus mounted at the bracket and generally at or over the rain sensor and above the camera module.

Although shown and described as having the mirror assembly attached at the mounting bracket (which is attached at the vehicle windshield), it is envisioned that the mirror assembly may mount to a mirror mounting button that is adhesively attached at the in-cabin surface of the windshield, whereby the bracket of the present invention may mount at the windshield at or near or adjacent to the mirror mounting button and mirror assembly. The bracket (with the mirror assembly attached separate therefrom) may be configured to support a rain sensor device and/or camera module, such as described above.

Thus, and with reference to FIGS. 6-9, the bracket 20 may be attached at an in-cabin surface of a vehicle windshield 14, whereby, with the bracket attached at the windshield, the rain sensor device 22 may be attached at the bracket (or optionally, the rain sensor may be attached at the bracket before the bracket is attached at the windshield). The camera module 10 may be readily attached at the bracket (either before or after the bracket is attached at the windshield), and the mirror assembly may also be readily attached at the bracket (either before or after the bracket is attached at the windshield). A cover element (not shown) may be provided that attaches at the bracket to substantially encase or house the camera module and bracket so that the camera module and bracket are not readily viewable to a person viewing the construction at the windshield from inside the vehicle cabin.

Optionally, the bracket of the present invention may be provided or configured for a particular windshield angle. For example, windshields of vehicles may be slanted at different rake angles, and the bracket may be configured to provide a selected mounting angle of the camera for a given windshield rake angle. For example, the windshield facing surface of the bracket may be the same or about the same for a variety of different windshield rake angles, and the bracket (such as the opposite surface and/or the camera module mounting receptacles and/or the camera module support elements) may be formed differently relative to the windshield facing surface or portion of the bracket to provide different mounting angles of the camera for different windshield angles. For example, the windshield facing surface of the bracket may contact and run along the windshield surface and the other side of the bracket may be selectively angled relative to first side of the bracket to provide the desired or selected bracket shape and camera mounting angle (or the camera module mounting receptacles may be spaced more or less from the windshield facing surface of the bracket to adjust the mounting angle of the camera module).

Figure 6:
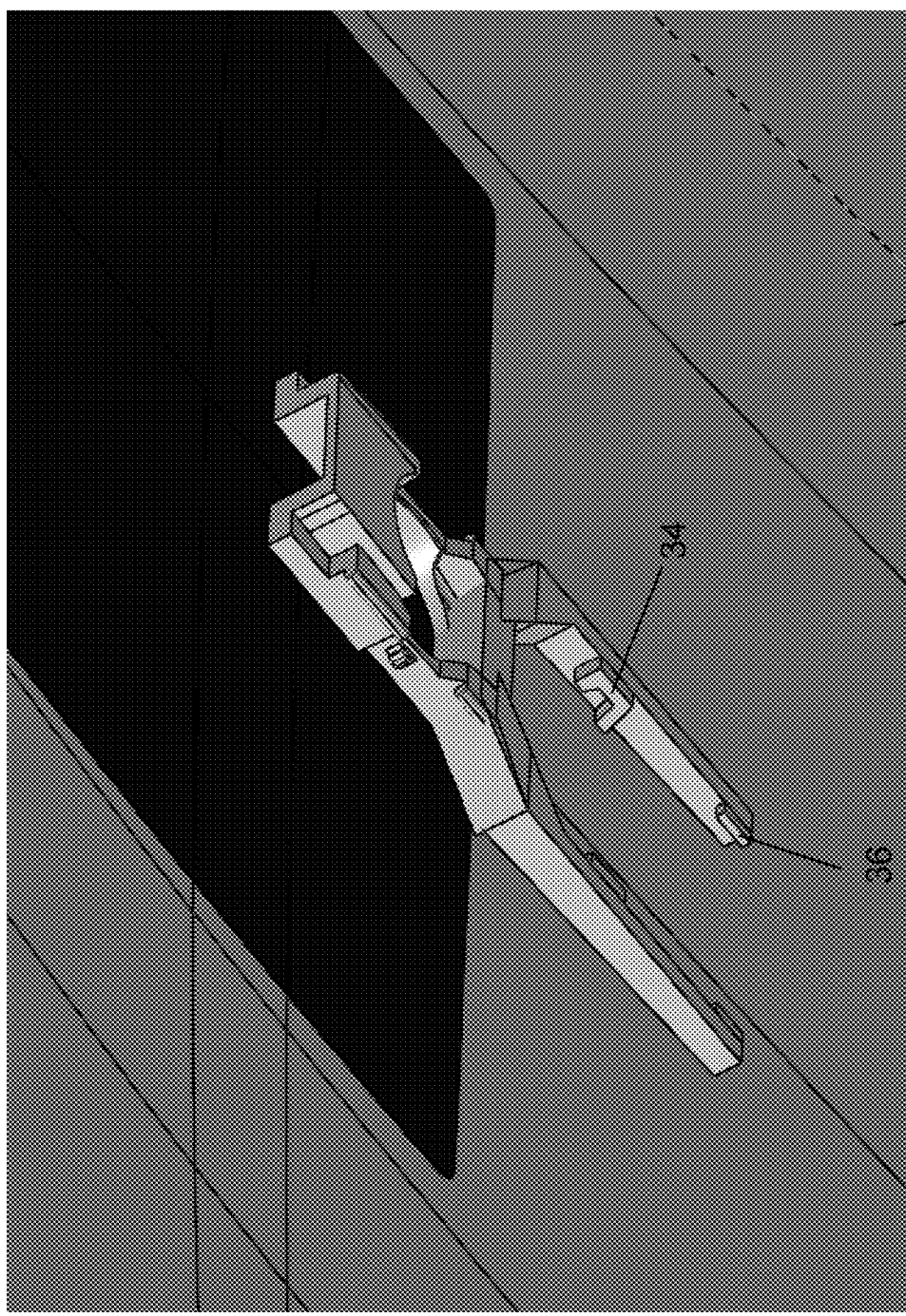
FIG. 6 is a perspective view of the mounting bracket as attached at a windshield of a vehicle.

Thus, in accordance with the present invention, an accessory attachment system is provided that is efficient and economic in accommodating the accessory option desires/choices of an automaker. Taking, for illustrative purposes, a popular vehicle, such as a Ford Focus, Ford may choose to equip lower level vehicles only with an interior rearview mirror assembly, and higher level vehicles may be equipped with a rain sensor and an interior rearview mirror assembly, and higher or highest level vehicles may be equipped with a forward facing camera and vision system and rain sensor and interior rearview mirror assembly. Thus, in accordance with the present invention, Ford may elect a twist-on mirror mounting button designed for mounting an interior rearview mirror assembly, and a Ford Focus windshield manufacturer may attach the selected button at the windshield for lower level vehicles. If such a button is formed in accordance with U.S. Pat. No. 6,326,613, incorporated above, and is annular with a central opening, the same mirror button can accommodate a rain sensor for the next higher level vehicles or vehicle option. For the higher vehicle levels that require or include a camera, Ford may require the windshield for those vehicles to be equipped with the bracket of the present invention (such as shown in FIG. 6), where the sites to receive both the interior rearview mirror assembly and the rain sensor are configured and constructed into the construction and configuration of the bracket itself. Thus, the windshield manufacturer need only attach the bracket such as shown in FIG. 6 for the higher level vehicles. Alternatively, the annular mirror mounting button may be attached at the windshield and in addition a bracket akin to what is shown in FIG. 6 (but without the mirror mounting portion) may be separately attached (either directly or via attaching elements or posts), but with a portion of the bracket surrounding the separate mirror mounting button such that the mirror mounting button nests into the separate bracket. This has the advantage that the windshield area immediately surrounding where the mirror mounting button is located can be utilized as an adhesion attachment surface area for the bracket, thus further enhancing the stability and securing of the bracket at the windshield. By nesting and/or surrounding the mirror mounting button at the bracket as described above, the overall footprint and thus size of the completed windshield electronic module is thereby reduced. For example, by nesting the mirror attachment element or mounting button or otherwise including the mirror attachment element/button at the mounting bracket, the overall footprint of the combination may be reduced so that the overall combination of the various accessories can be hidden from view by a driver or other occupant of the vehicle with a small dimension plastic cover or the like.

Thus, the present invention provides a mounting bracket that may be attached at a vehicle windshield and provides attachment for at least an interior rearview mirror assembly. In applications where the vehicle includes a camera module and/or a rain sensor, the bracket can accommodate attachment of a camera module and/or a rain sensor, and allows for such attachment or attachments to be made after the bracket is attached at the vehicle windshield. Thus, the present invention provides for enhanced manufacturing processes and allows for selective mounting or configuration of a camera and/or rain sensor at the bracket, such as for vehicles that optionally include such content, while allowing for use of a common bracket for applications that may not include such content. For example, the same or common bracket may be used for a vehicle application that does not include a rain sensor or a camera module, as well as for a vehicle application that does include a rain sensor and/or a camera module.

Optionally, the camera module may be adjustable to adapt or configure the module for different windshield applications (having different angles relative to horizontal) of different vehicles, while still providing the desired, generally horizontal, forward field of view of the camera or imager assembly. The camera module is configured to mechanically attach to a frame or bracket, which may include a plurality of fixing elements or attaching elements, which are configured for adhesive attachment to the in-cabin surface of the vehicle windshield. The camera module may attach to the frame or bracket (with the frame or bracket attached at the windshield surface) via any suitable means, such as via a sliding engagement or snap attachment or the like.

The camera module of the present invention provides for a low profile module that may be selected or adjusted to provide a desired viewing angle for the particular application of the camera module. The module thus keeps the lens angle or viewing angle of the imager in the same orientation or position for different windshield angle applications. The module may be adapted or configured for different applications by adjusting the camera holder or installing an appropriate or selected low cost plastic holder or replacing the plastic holder with an appropriate or selected holder, while keeping the camera and lens and PCB and housing the same or common components of the module for the various windshield applications (so that the manufacturer does not have to replace the PCB for different windshield angles), and while keeping the profile of the module the same for various windshield applications.

Because of the number of components established at the main circuit board of the camera module, it is desirable to have the main circuit board comprise a double sided PCB with circuitry and components established at both sides of the circuit board. The flexible connector or cable provides LVDS signals conveying image data captured by the imager to the image processor of the main circuit board. Alternately, image data captured by the imager may be conveyed to the image processor via the likes of Ethernet or by the protocols described in U.S. Pat. No. 7,697,027, which is hereby incorporated herein by reference in its entirety. The aperture or opening or hole in the main circuit board provides for passage of the flexible connector through the circuit board so as to establish electrical connection to the opposite side of the main circuit board, and the aperture or opening or hole in the main circuit board also at least partially receives a portion of imager assembly (such as a portion of the imager circuit board and/or imager and/or lens holder and/or lens) to provide a lower profile camera system or module.

Optionally, the camera module may include ventilation means for ventilating the module at the windshield (such as by utilizing aspects of the modules described in U.S. patent application Ser. No. 11/721,406, filed Jun. 11, 2007 and published Dec. 3, 2009 as U.S. Publication No. US-2009-0295181; and/or U.S. patent application Ser. No. 12/393,223, filed Feb. 26, 2009, which are hereby incorporated herein by reference in their entireties). For example, the ventilation means may comprise one or more vents or ports or ventilation openings (such as a vent or port or opening established through the housing and/or gasket and/or frame or the like), a gas permeable and fluid impermeable material, a baffle that passes air and that blocks moisture, and/or a breathable membrane and/or the like. Such ventilation means may be provided to reduce moisture or fogging of the windshield at the viewing area of the camera or imager. Optionally, a localized heater element or grid may be established at the windshield (such as a conductive trace, such as a transparent conductive trace or the like, established at the in-cabin surface of the windshield local to the camera module) to provide heating of the windshield at the area through which the camera views, in order to reduce moisture or fogging of the windshield at the viewing area of the camera or imager.

The vision system that utilizes the forward facing camera may also include one or more other imaging sensors or cameras (such as a rearward facing imaging sensor or camera and/or a forwardly facing camera at the front of the vehicle, and/or a sidewardly/rearwardly facing camera at the sides of the vehicle), which capture images exterior of the vehicle, with the cameras having a lens for focusing images at or onto an imaging array or imaging plane of the camera. The vision system is operable to process image data captured by the cameras and may provide displayed images at a display device for viewing by the driver of the vehicle. Optionally, the vision system may process image data to detect objects, such as objects forward of the vehicle during forward driving or such as objects to the rear of the subject or equipped vehicle during a reversing maneuver, or such as approaching or following vehicles or vehicles at a side lane adjacent to the subject or equipped vehicle or the like.

The forward facing camera may be disposed at or housed at a casing or module (such as at a windshield electronics module or the like) that is configured to attach at an interior or in-cabin surface of a vehicle windshield, such as described above. Optionally, the module 10 and camera 28 may utilize aspects of the imaging systems and/or modules described in U.S. Pat. Nos. 7,946,505; 7,188,963; 7,004,593; 6,824,281; 6,968,736; 6,690,268; 6,250,148; 6,341,523; 6,593,565; 6,428,172; 6,501,387; 6,329,925; and 6,326,613, and/or in U.S. patent application Ser. No. 10/538,724, filed Jun. 13, 2005 and published Mar. 9, 2006 as U.S. Publication No. US-2006-0050018, and/or U.S. patent application Ser. No. 11/721,406, filed Jun. 11, 2007, now U.S. Pat. No. 8,256,821; and/or Ser. No. 13/258,850, filed Sep. 22, 2011, now U.S. Pat. No. 8,451,332, which are hereby incorporated herein by reference in their entireties. Optionally, the forward facing camera may be disposed at a module that is spaced from the windshield, such as at or near or part of the interior rearview mirror assembly, or the forward facing camera may be disposed at or in the interior rearview mirror assembly that is attached at an in-cabin portion of the vehicle, while remaining within the spirit and scope of the present invention. The baffles or light baffling elements of the baffle configuration or structure may be disposed or established at a plate or substrate, which may be disposed at or in the module and may be arranged generally horizontally in front of and below the imaging sensor (or a lens or optical assembly of the imaging sensor or camera), with the baffles extending laterally in a cross car direction in front of the imaging sensor or camera. The baffles or light baffling elements may be generally vertically arranged at the plate or substrate or base of the baffle structure, so that the light baffling elements may be generally vertically oriented when the base of the structure is generally horizontally disposed at the vehicle (with selected angles of the opposite surfaces of the light baffling elements as discussed below).

Optionally, the bracket may include attachment means (such as slots or the like) for attaching the bracket to one or more (such as three or four) fixing elements or attachment elements adhered at the windshield surface, and may include or support a stray light shield that shields light emanating from inside the vehicle from being received by the camera. Thus, the bracket may provide the light shield at or in front of the camera and lens, and may also provide a light baffling element or system that limits light emanating from outside the vehicle and passing through the windshield from reflecting off of the generally horizontal portion of the bracket in front of the camera towards the camera and lens. The light baffling system provides a plurality of baffles or generally vertically oriented ribs that cause the light passing through the windshield to reflect between opposing surfaces of the ribs before reflecting towards the camera and lens, such that the light is scattered and the intensity of the scattered light at the camera and lens is reduced.

As discussed above, the present invention provides for a camera module that is attachable at or to a bracket that attaches at the vehicle windshield, with the bracket and/or camera module having a light shield to adapt the camera module for the particular vehicle or windshield application of the camera module. Typically, different OEMs and different types and styles of vehicles elect to use different windshield angles (for example, some windshields of some vehicles are more vertical and some windshields of some vehicles are more sloped). The present invention provides a light shield element or component that is selected for a particular windshield or vehicle application, such that a common camera module may be used in various applications (having different windshield angles and the like), with a selected or appropriate light shield and bracket used to mount or attach the common or universal camera module at the windshield. The manufacturer can set or compensate for the particular windshield angle of a particular vehicle by the forming or molding (such as injection molding of a polymeric material, preferably a dark or light absorbing or non-reflecting plastic or polymeric material or the like) of that particular light shield.

The present invention thus may provide for a standard or stock camera module that is configured to attach to a selected particular bracket for a particular application. The field of view of the camera or imager of the standard camera module may be set for the different vehicle applications by using the molding of the selected bracket for the different applications. The present invention thus provides for a separate and independent light shield, which provides for decoupling or divorcing of the light shield from the camera module itself. Thus, when the light shield and bracket abut against the windshield, the aperture of the frit allows light to pass through the windshield, while the walls of the pocket of the light shield abut the windshield (with a gasket or seal disposed therebetween) to block light emanating from inside vehicle from being received by the imager.

The windshield may have an opaque or light absorbing or non-light-transmitting layer (such as an opaque ceramic frit layer or the like) disposed at the area of the windshield at which the bracket is mounted, with an aperture established through the opaque layer generally at the area in front of and generally aligned with the imager assembly when the bracket and camera housing are attached at the windshield and with the same aperture or a second aperture also aligned with any rain sensor used, so that the camera and the rain sensor can view through the windshield through the aperture or apertures formed through the opaque frit layer.

The camera module or housing may be moved or slid along the bracket to attach the housing at the bracket. For example, the front of the housing may include a front mounting lip that is received at or engages the front mounting tab or tabs of the bracket while rear mounting tabs of the camera housing may engage or be received in respective rear tabs or receptacles of the bracket. When the camera housing or module is so attached at the bracket, the lens of the imager assembly protrudes at least partially through the opening in the shield portion of the bracket, with its field of view through or across the pocket and through the aperture at the windshield.

When the camera module is attached at the bracket at the windshield, the imager assembly has a field of view through the aperture in the opaque layer at the windshield W, with no obstruction in the field of view of the imager. The field of view of the imager is set (such as by the bracket configuration) to be at or slightly above horizontal (such as, for example, at least about 0.5 degrees above horizontal or about 1 degree above horizontal or at about 2 degrees above horizontal or thereabouts), with the field of view of the imager encompassing the ground ahead of the equipped vehicle at less than about 7 m from the imager. The stray light shield is arranged so that it extends from the lens of the imager to where the field of view of the imager crosses the windshield. The camera module and bracket configuration also provide for the imager to be mounted at the windshield at a location that is a reduced distance from the windshield (such as less than about 4 mm, preferably less than about 2 mm and preferably about 2.0+/−1.9 mm or thereabouts).

Thus, in accordance with the present invention, the camera holder or module (including the camera and housing portion) is configured to attach to a bracket that is attachable at the in-cabin surface of the vehicle windshield, such as via attachment to one or more attachment elements adhesively attached at the in-cabin surface of the vehicle windshield. The bracket has an aperture for at least partially receiving and/or aligning with the camera and lens, such that the camera views through the windshield of the vehicle when the camera holder is attached at the bracket that is attached at the windshield. The camera holder and/or the bracket and/or a separate element provides a light shield having a wedge-shaped or tapered recess or pocket at the camera lens, whereby the camera views through the recess or pocket and through the windshield (such as by utilizing aspects of the camera systems described in U.S. Pat. Nos. 8,256,821 and/or 6,824,281, and/or U.S. patent application Ser. No. 13/470,860, filed May 14, 2012, now U.S. Pat. No. 8,405,726, which are hereby incorporated herein by reference in their entireties). The wedge-shaped recess or pocket is defined or formed by a base portion and opposite sidewalls that taper towards the lens and that extend generally upwards from the base portion to form the wedge-shaped recess or pocket between the in-cabin surface of the windshield and the base portion.

Optionally, a separate stray light shield may be provided as a separate component that attaches at the camera module before the camera module is attached at a bracket attached at a vehicle windshield. In such a configuration, a selected light shield and bracket may be selected for a particular vehicle application, whereby the selected light shield and bracket are used with a common or universal camera module to adapt the camera module for the particular or selected vehicle and windshield application.

For example, and as shown in FIGS. 2-5, the light shield element is configured to attach at a camera module or camera holder or housing to provide the desired or selected or appropriate light shield feature or configuration at the imager and lens assembly for the particular vehicle windshield application of the camera module. In the illustrated embodiment, the light shield element comprises a tapered generally wedge-shaped pocket or recess having a lower or base portion and tapering sidewalls. A partial aperture or notch is established at the narrower end region of the pocket or recess to at least partially receive a lens portion of the camera when the light shield is attached at the camera module. In the illustrated embodiment, the light shield also includes a plurality of baffles or ribs at the lower portion to limit glare or reflection of light emanating from outside of the vehicle and passing through the windshield from being received at the camera or imager assembly.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The vehicle and/or vision system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser.

No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; and/or Ser. No. 61/806,674, filed Mar. 29, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication Nos. WO 2010/099416; WO 2011/028686; and/or WO 2013/016409, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicle vision system comprising:
a bracket, wherein said bracket comprises a base portion configured to attach at an in-cabin surface of a windshield of a vehicle equipped with said vision system;
wherein said bracket includes a camera module attachment portion and at least one of (i) a rain sensor attachment portion and (ii) an interior rearview mirror assembly attachment portion;
wherein said camera module attachment portion of said bracket comprises a generally U-shaped construction having a pair of spaced apart legs extending from said base portion, and wherein each of said legs has at least one camera attaching element;
wherein, with said bracket attached at the in-cabin surface of the windshield, said spaced apart legs of said camera module attachment portion of said bracket extend downwardly from said base portion and along the in-cabin surface of the windshield;
wherein, with said bracket attached at the in-cabin surface of the windshield, a camera module is mountable to said camera module attachment portion of said bracket, and wherein said camera module comprises a camera having an image sensor array and a lens;
wherein, with said camera module mounted to said camera module attachment portion, said camera module is disposed at least partially between said legs of said camera module attachment portion of said bracket, and wherein said camera module comprises a pair of bracket attaching elements that engage said camera attaching elements of said legs of said camera module attachment portion of said bracket when said camera module is mounted to said camera module attachment portion of said bracket;
a stray light shield configured to attach at one of said camera module and said bracket, wherein, when said camera module is mounted at said camera module attachment portion of said bracket attached at the in-cabin surface of the windshield, said stray light shield shields said image sensor array from light emanating from within the cabin of the equipped vehicle; and
wherein, at least when said camera module is mounted at said camera module attachment portion of said bracket attached at the in-cabin surface of the windshield, said stray light shield is disposed at said camera module and said lens views through the windshield of the equipped vehicle via a pocket of said stray light shield.

2. The vehicle vision system of claim 1, wherein said camera attaching elements of said bracket comprise receiving portions and wherein said bracket attaching elements of said camera module comprise protrusions, and wherein said protrusions of said camera module are received at said receiving portions of said bracket when said camera module is mounted to said bracket.

3. The vehicle vision system of claim 1, wherein said bracket includes a rain sensor attachment portion.

4. The vehicle vision system of claim 3, wherein, with said bracket attached at the in-cabin surface of the windshield, a rain sensor is mountable to said rain sensor attachment portion of said bracket.

5. The vehicle vision system of claim 4, wherein said rain sensor attachment portion is at said base portion of said bracket.

6. The vehicle vision system of claim 5, wherein said rain sensor snap attaches at said rain sensor attachment portion of said base portion of said bracket.

7. The vehicle vision system of claim 1, wherein said bracket includes an interior rearview mirror assembly attachment portion.

8. The vehicle vision system of claim 7, wherein, with said bracket attached at the in-cabin surface of the windshield, an interior rearview mirror assembly is mountable to said interior rearview mirror assembly attachment portion of said bracket.

9. The vehicle vision system of claim 8, wherein said interior rearview mirror assembly attachment portion is disposed at said base portion of said bracket.

10. The vehicle vision system of claim 1, wherein said camera attaching elements of said bracket comprise a first camera attaching element at a lower end region of each of said legs and a second camera attaching element spaced from said lower end region of each of said legs, and wherein said bracket attaching elements of said camera module comprise a first bracket attaching element at each side of said camera module at a forward end region of said camera module and a second bracket attaching element spaced from said forward end of said camera module, and wherein said first and second bracket attaching elements engage said first and second camera attaching elements, respectively, when said camera module is mounted to said camera module attachment portion of said bracket.

11. The vehicle vision system of claim 1, wherein said bracket is formed by injection molding.

12. The vehicle vision system of claim 11, wherein said bracket comprises an engineering plastic and wherein said engineering plastic comprises at least one of Ultra-high-molecular-weight polyethylene, Nylon 6, Nylon 6-6, acrylonitrile butadiene styrene, polycarbonate, polyamide, polybutylene terephthalate, polyethylene terephthalate, polyphenylene oxide, polysulphone, polyetherketone, polyetheretherketone, polyimides, polyphenylene sulfide and polyoxymethylene plastic.

13. A vehicle vision system comprising:
a bracket, wherein said bracket comprises a base portion configured to attach at an in-cabin surface of a windshield of a vehicle equipped with said vision system;
wherein said bracket includes a camera module attachment portion;
wherein said camera module attachment portion of said bracket comprises a generally U-shaped construction having a pair of spaced apart legs extending from said base portion, and wherein each of said legs has at least one camera attaching element;
wherein said legs of said camera module attachment portion of said bracket extend downwardly from said base portion and along the in-cabin surface of the windshield when said base portion of said bracket is attached at the in-cabin surface of the windshield of the equipped vehicle;
wherein, with said bracket attached at the in-cabin surface of the windshield, a camera module is mountable to said camera module attachment portion of said bracket, and wherein said camera module comprises a camera having an image sensor array and a lens;
wherein, with said camera module mounted to said camera module attachment portion, said camera module is disposed at least partially between said legs of said camera module attachment portion of said bracket, and wherein said camera module comprises a pair of bracket attaching elements that engage said camera attaching elements of said legs of said camera module attachment portion of said bracket when said camera module is mounted to said camera module attachment portion of said bracket;

a stray light shield configured to attach at one of said camera module and said bracket, wherein, when said camera module is mounted at said camera module attachment portion of said bracket attached at the in-cabin surface of the windshield, said stray light shield shields said image sensor array from light emanating from within the cabin of the equipped vehicle;

wherein, at least when said camera module is mounted at said camera module attachment portion of said bracket attached at the in-cabin surface of the windshield, said stray light shield is disposed at said camera module and said lens views through the windshield of the equipped vehicle via a pocket of said stray light shield; and wherein said base portion of said bracket comprises at least one of (i) a rain sensor attachment portion for mounting a rain sensor thereat and (ii) an interior rearview mirror assembly attachment portion for mounting an interior rearview mirror assembly thereat.

14. The vehicle vision system of claim 13, wherein said camera attaching elements of said legs of said camera module attachment portion of said bracket comprise receiving portions and wherein said bracket attaching elements of said camera module comprise protrusions, and wherein said protrusions of said camera module are received at said receiving portions of said legs when said camera module is mounted to said camera module attachment portion of said bracket.

15. The vehicle vision system of claim 13, wherein said base portion of said bracket comprises a rain sensor attachment portion for mounting a rain sensor thereat, and wherein, with said bracket attached at the in-cabin surface of the windshield, the rain sensor is mountable to said rain sensor attachment portion of said bracket.

16. The vehicle vision system of claim 15, wherein the rain sensor snap attaches at said rain sensor attachment portion of said base portion of said bracket.

17. The vehicle vision system of claim 13, wherein said base portion of said bracket comprises an interior rearview mirror assembly attachment portion for mounting an interior rearview mirror assembly thereat, and wherein, with said bracket attached at the in-cabin surface of the windshield, the interior rearview mirror assembly is mountable to said interior rearview mirror assembly attachment portion of said bracket.

18. A vehicle vision system comprising:

a bracket, wherein said bracket comprises a base portion configured to attach at an in-cabin surface of a windshield of a vehicle equipped with said vision system;

wherein said bracket includes a camera module attachment portion;

wherein said camera module attachment portion of said bracket comprises a generally U-shaped construction having a pair of spaced apart legs extending from said base portion, and wherein each of said legs has at least one camera attaching element;

wherein said legs of said camera module attachment portion of said bracket extend downwardly from said base portion and along the in-cabin surface of the windshield when said bracket is attached at the in-cabin surface of the windshield of the equipped vehicle;

wherein, with said bracket attached at the in-cabin surface of the windshield, a camera module is mountable to said camera module attachment portion of said bracket, and wherein said camera module comprises a camera having an image sensor array and a lens;

wherein said camera attaching elements of said legs of said camera module attachment portion of said bracket comprise receiving portions and wherein bracket attaching elements of said camera module comprise protrusions, and wherein said protrusions of said camera module are received at said receiving portions of said legs when said camera module is mounted to said camera module attachment portion of said bracket;

a stray light shield configured to attach at one of said camera module and said bracket, wherein, when said camera module is mounted at said camera module attachment portion of said bracket attached at the in-cabin surface of the windshield, said stray light shield shields said image sensor array from light emanating from within the cabin of the equipped vehicle;

wherein, at least when said camera module is mounted at said camera module attachment portion of said bracket attached at the in-cabin surface of the windshield, said stray light shield is disposed at said camera module and said lens views through the windshield of the equipped vehicle via a pocket of said stray light shield;

wherein said base portion of said bracket comprises (i) a rain sensor attachment portion for mounting a rain sensor thereat and (ii) an interior rearview mirror assembly attachment portion for mounting an interior rearview mirror assembly thereat;

wherein, with said bracket attached at the in-cabin surface of the windshield, the rain sensor is mountable to said rain sensor attachment portion of said bracket; and wherein, with said bracket attached at the in-cabin surface of the windshield, the interior rearview mirror assembly is mountable to said interior rearview mirror assembly attachment portion of said bracket.

19. The vehicle vision system of claim 18, wherein at least one of (i) the rain sensor snap attaches at said rain sensor attachment portion of said base portion of said bracket and (ii) the interior rearview mirror assembly snap attaches at said interior rearview mirror assembly attachment portion of said base portion of said bracket.

20. The vehicle vision system of claim 18, wherein said bracket is formed by injection molding an engineering plastic and wherein said engineering plastic comprises at least one of Ultra-high-molecular-weight polyethylene, Nylon 6, Nylon 6-6, acrylonitrile butadiene styrene, polycarbonate, polyamide, polybutylene terephthalate, polyethylene terephthalate, polyphenylene oxide, polysulphone, polyetherketone, polyetheretherketone, polyimides, polyphenylene sulfide and polyoxymethylene plastic.

\* \* \* \* \*